United States Patent [19]

Strauff

[11] 3,952,631
[45] Apr. 27, 1976

[54] PRESSURE MEDIUM CONTROL DEVICE
[75] Inventor: Günther Strauff, Kaarst, Germany
[73] Assignee: Langen & Co., Duesseldorf, Germany
[22] Filed: Dec. 21, 1973
[21] Appl. No.: 427,131

Related U.S. Application Data
[63] Continuation-in-part of Ser. No. 391,271, Aug. 24, 1973.

[30] Foreign Application Priority Data
Dec. 21, 1972 Germany............... 2242021

[52] U.S. Cl................................ 91/372; 91/375 A
[51] Int. Cl.² ............................................ F15B 9/10
[58] Field of Search ............ 91/370, 371, 372, 377, 91/375 A, 375 R

[56] References Cited
UNITED STATES PATENTS

| | | | |
|---|---|---|---|
| 2,754,924 | 7/1956 | Hammond | 91/372 |
| 2,763,159 | 9/1956 | Barth et al. | 91/372 |
| 3,298,316 | 1/1967 | Budzich | 91/371 |
| 3,408,900 | 11/1968 | Tomita | 91/372 |

FOREIGN PATENTS OR APPLICATIONS

| | | | |
|---|---|---|---|
| 1,920,826 | 11/1970 | Germany | 91/375 A |

Primary Examiner—Paul E. Maslousky
Attorney, Agent, or Firm—Holman & Stern

[57] ABSTRACT

The instant invention concerns a pressure medium control device for controlling the working chambers of a servo-motor, whereby said servo-motor is provided with two control valves which are actuated via actuator means through relative movements between a power input member and a power output member which is connected with said power input member by means of elastic, resilient, especially pre-stressed coupling means, and whereby the servo-motor is in operative connection with the power output member and the control valves are provided with reaction areas for reflecting the developing pressures to the power input member, and/or are in operative connection with one or a plurality of corresponding reaction members, whereby the power transmission from the power input member to the control valves, which is necessary for activating the control valves, is effected via a lost motion coupling to which a further elastic resilient coupling means is parallel-switched, especially for two control valves which are arranged transverse and off-center in a valve member, according to German Patent Application P 22 42 021.9.

3 Claims, 4 Drawing Figures

3,952,631

PRESSURE MEDIUM CONTROL DEVICE

This application is a Continuation-in-Part of Ser. No. 391,271, filed Aug. 24, 1973.

BACKGROUND OF THE INVENTION

The parent application Ser. No. 391,271 is based on the idea to enable a power transmission from the power input member to the power output member in a purely mechanical manner without a servo-support, through the expedient of a lost-motion coupling between the power input member and the control valves, at low force expenditure. By means of an elastic, resilient coupling member mounted in the power-flow between the power input member and the control valves, it should furthermore be possible to gradually build up a mechanical-hydraulic power transmission in addition to the mechanical power transmission in the sense of an increasing reaction power and therewith also in increasing the servo-support.

Two embodiments were disclosed in the parent application for such an arrangement. In one embodiment, two springs operate in opposite directions between an actuating member and an individual control piston. In the second embodiment, two springs function between one lever which serves as actuating member and a second lever which affects two control pistons which are mounted transverse and off-center to its axis. Both cases have the similarity in that a longitudinal change of spring (or deformation of its extension) results necessarily in an opposite change of the other spring. In cases where the springs were hard or stiff enough, it was possible, to a certain extent, to increase the characteristic curve of the input power over the output power, however, there are recognized certain disadvantages in the utilization of such hard springs in the area of servo-control systems. These disadvantages consisted in that in steering-operations with purely mechanical power transmissions, namely, in pre-stressed coupling means, as well as during an outer reverse position of the wheels, it is necessary to build up a substantial fluid pressure in the servomotor in order to move the control piston, or one of a plurality of control pistons, via the inherent reaction area in a position which would release the fluid outflow. A further situation existed in the fact that it is difficult — on the basis of the mutually-releasing spring forces in a neutral position — to produce a predetermined initial fluid pressure in control valves having a four-way control and positive overlapping. Such an initial fluid pressure at a valve, for example, is however desirable in order to avoid negative pressure during steering-processes, to reduce noise, and to enable a dampened operation of the servopistons.

SUMMARY OF THE INVENTION

It is therefore the scope of the instant invention to construct a pressure medium control device of the above-mentioned type in such a manner so that an easy reverse fluid flow of the pressure means is guaranteed under outer forces or purely mechanical power transmission, and a certain initial pressure in the working chambers of the servo-motor is retained.

This problem is solved in a novel manner in that the elastic, resilient coupling means comprise spring-means which become effective directly between the control pistons of the control valves and the actuating members. Effectively, the resilient forces which develop during the deflection of the control pistons should be lower than the pre-stressing of the elastic-resilient coupling means between the power inlet member and the power outlet member. The pre-stressing of the springs should be proportioned so that a low initial pressure is also produced in a released spring during lost motion.

The operative manner of such an arrangement consists in that: on the reaction area of a control piston or a reaction member which is in operative communication with a control piston, the pressure of a working chamber affects the force of the spring, to thereby develop the function of a pressure-regulating valve. A pressure-regulating valve, however, has the characteristics of retaining the pressure in a secondary-circuit at a predetermined constant value, as long as the pre-stressing of the spring does not change. Since, however, we consider here very soft springs, the change in the pre-stressing results in a barely perceptible manner, so that the pressure-changes are also low. Only if a mechanical contact results between the actuating member and the control pistons, there results then a substantial change in the pressure. In so far as the pre-stressing of the coupling means is high enough, or if at least the pre-stressing during relative movements increases rapidly, a control piston can then behave practically independent of the other control pistons.

The objects and advantages of the instant invention will become apparent from the following description when taken with the appendend drawing forming a part thereof, wherein:

DESCRIPTION OF THE PREFERRED EMBODIMENTS

Figure 2:
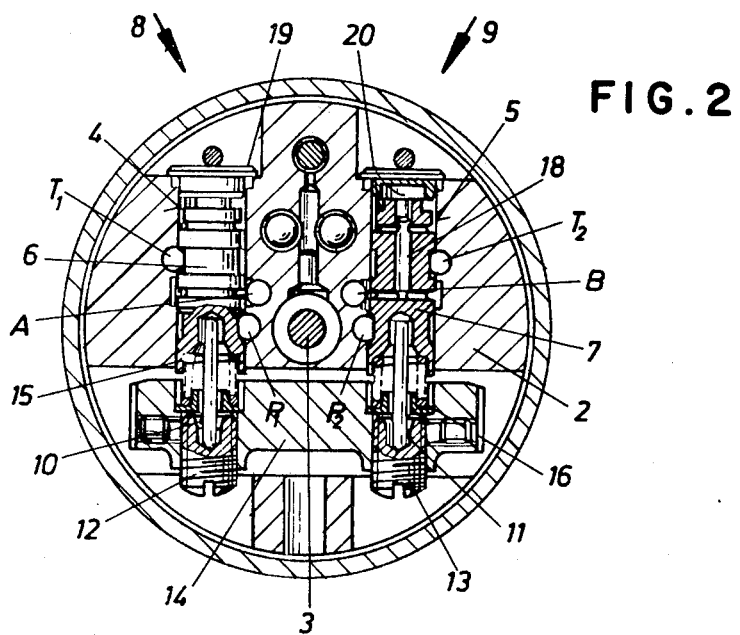
FIG. 2 shows a cross section according to line 2—2 of FIG. 1.

A shaft 1 which serves as the power input member is connected, for example, with a steering wheel in any suitable manner (not illustrated in detail) and a valve element 2, which serves as power output member, is connected with the shaft 1 via a torsion rod 3 serving as an elastic, resilient coupling means. Bore holes 4 and 5 are located in the valve element 2 transversely and off-center to its longitudinal axis (FIG. 2) into which control pistons 6 and 7 are slidably arranged, which, in connection with grooves and bore holes in the valve element 2, form control valves 8 and 9. The operation of the control pistons 6 and 7 is accomplished via push rods 10 and 11 which bear on set screws 12 and 13 which are mounted in a lever 14; the lever functioning as an actuating member and the lever 14 is fixedly connected with the shaft 1; springs 15 and 16 function between the lever 14 and the control pistons 6 and 7.

The valve element 2 is journaled in a connecting member 17 and cooperates with the same in the manner of a rotation distributor. Connections for a fluid pressure source (not illustrated in detail) are in contact, by means of annular grooves and transverse, as well as longitudinal, bore holes in the connecting member 17 and in the valve element 2, and with respective control grooves or control slots on the control valves 8 and 9; for purposes of simplicity, and for a better understanding, the fluid connections are indicated directly on the control pistons 6 and 7 in the valve element 2.

In a neutral position of the control piston 6 through its shoulders, said piston closes a port A which is connected with a working chamber of a servo-motor. If the control piston 6 is pushed further into the bore hole 4, a fluid communication between port A to a port $P_1$ is effected with a fluid pressure source (not shown in detail). An opposite movement results in a communication of port A with a port $T_1$ which is in contact with a return line. The control piston 7, when in a neutral position, closes port B. If the control piston 7 is pushed further into the bore hole 5, this movement will then produce communication between port B and port $P_2$ which is also connected with the aforementioned pressure source. If the control piston 7, however, is moved out of the bore 5, there will then develop communication between the port B and a port $T_2$ which is also connected with the return line. Reaction chambers 19 and 20 are each connected with the ports A or B by means of passages 18 within the control pistons 6 and 7, and said pistons are fronted by the reaction chambers.

It should be noted that in the illustrated neutral position of the control pistons 6 and 7, the push rods 10 and 11 have no contact with the respective control pistons, so that during relative movements between the lever 14 and the valve element 2 there is initially provided a lost motion coupling; the lost motion can be adjusted within varied limits, through the adjustment of set screws 12 and 13.

OPERATION

During operation, it may be assumed that the servo-motor (not shown in detail) might be moved by means of external forces, for example, by a reverse movement of the steered wheels in a manner so that an insignificant pressure increase would develop in the reaction chamber 19. This pressure increase might be sufficient to move the control piston 6 from its neutral position towards the force of the relatively weak spring 15 in a manner so as to produce communication between the ports A and $T_1$. The pressurized fluid can then flow from port A via port $T_1$ into the return line and relative movement between the lever 14 and the valve element 2 is thereby not necessary. In the event a person driving a vehicle utilizing the novel system strikes a curb, for example, an immediate pressure would be developed on a servo-motor which would be directed back to one of the reaction chambers 19, 20. In the event such a pressure is developed, the springs 15 and 16 will automatically compensate for this development of a back pressure wherein the control piston 6, for example, will have downward movement against the spring 15 resulting in port A communicating with port $P_1$, i.e., for the return. Correspondingly, release of pressure in chamber 20 results in communication of port B with pressure port $P_2$ due to the pressure of spring 16, while at the same time no reaction is being sensed or felt by the operator of the vehicle to the torsion rod 3, for example.

In a reverse manner, a low pressure-reduction will result in the other working chambers of the servo-motor. This pressure-reduction communicates with the reaction chamber 20 so that the pressure force on the control piston 7, which is subject to the balance of spring 16, is reduced; when this occurs, the spring 16 moves the control piston 7 somewhat further into bore 5 so that a communication is produced between the ports B and $P_2$. Pressurized fluid is then able to flow into the enlarged working chamber of the servo-motor from port $P_2$ via the port B. This movement of the control piston 7 can also result without a relative movement between the lever 14 and the valve housing 2, so that it is obvious that the control pistons 6 and 7 are able to function independently of the movement of lever 14. Similar conditions result in those areas of steering, where only low steering-powers have to be overcome so that the forces transmitted via the torsion rod 3 will suffice without substantial servo-support. Only when these forces substantially increase, and a relative movement between lever 14 and valve element 2 results, so that one of the push rods 10 or 11 enters into a mechanical contact with its respective control piston, then from this mode of operation does the fluid-pressure control-device function in the common manner of operation.

Figure 1:
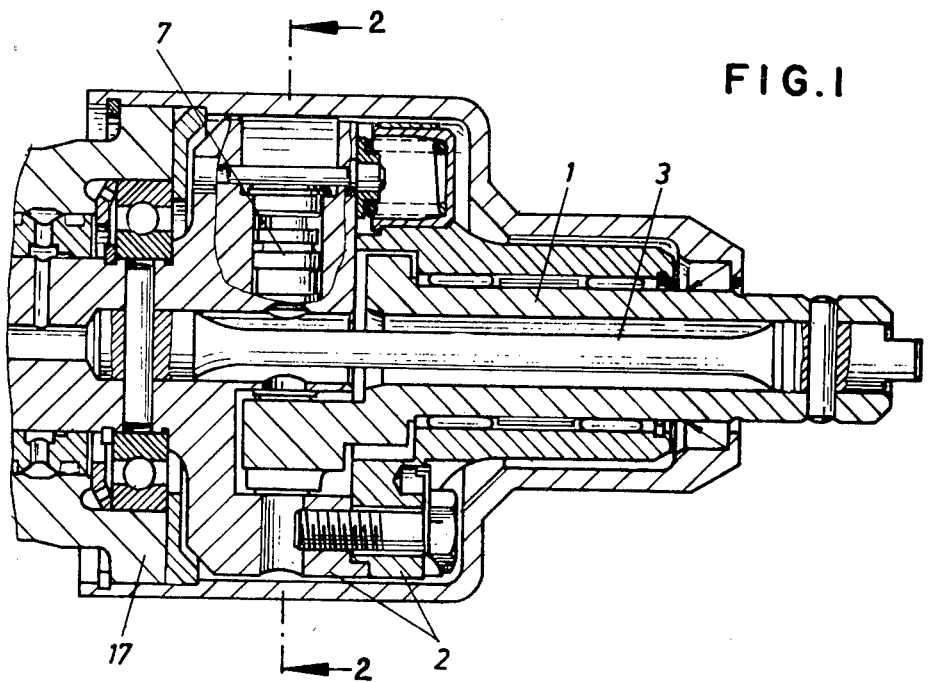
FIG. 1 is a cross section of a pressure medium control device along its longitudinal axis and parallel to the control pistons, in which a torsion rod serves as a coupling element.
Figure 3:
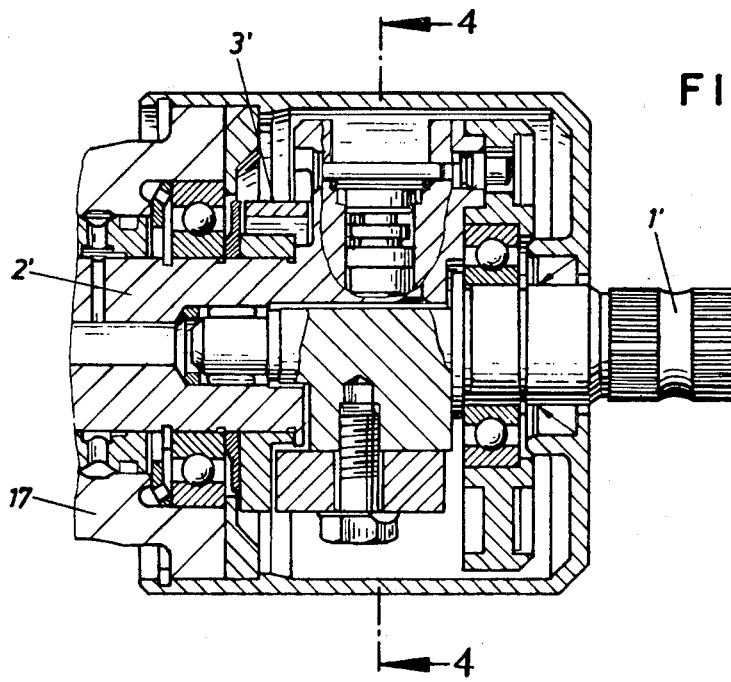
FIG. 3 illustrates a pressure medium control device, which utilizes a pre-stressed, annular spring element as a coupling means, in a crosscut along its axis and parallel to the control pistons.
Figure 4:
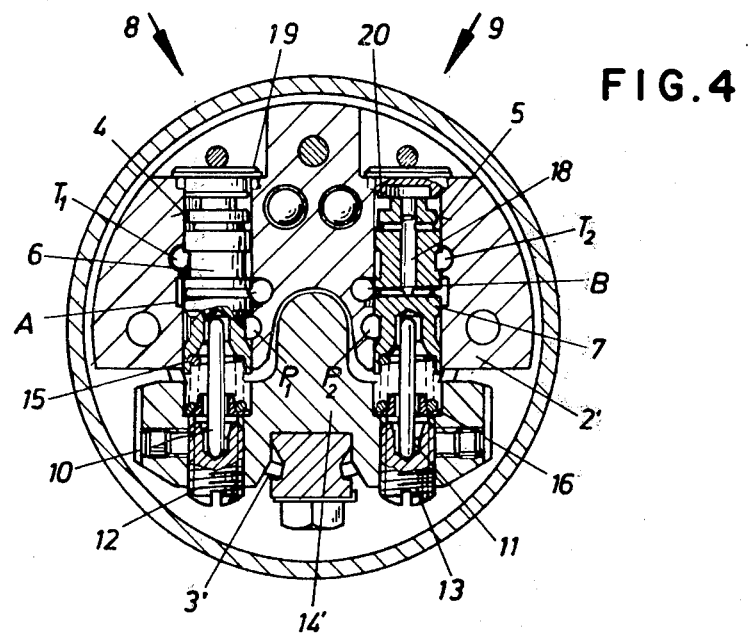
FIG. 4 is a cross section according to line 4—4 of FIG. 3.

Referring to FIGS. 3 and 4, similar parts are indicated by identical reference numerals, and functionally equivalent parts are identified with reference numerals with a primed symbol. The main difference between the embodiment of FIGS. 3 and 4 as compared with the arrangement of FIGS. 1 and 2 lies in the fact that in place of the torsion rod 3 shown therein, there is utilized now an annular, pre-stressed spring element 3' as the elastic, resilient coupling means between a power input member 1' and a valve housing 2'.

Such a type spring element is disclosed in the German parent application No. P 22 56 073.2 and U.S. Ser. No. 391,272 so that a more detailed description at this point is not needed. In so far as the function of the control pistons 6 and 7 as well as the springs 15 and 16 are concerned, there exists no difference in view of the embodiments of FIGS. 1 and 2.

The instant invention is not limited to the embodiments illustrated. It is especially not necessary to arrange the control pistons parallel to each other and off-center to the axis of the valve element. The control pistons can also be arranged coaxially in a mutual recess or in aligned recesses. In such a case, the movement of the control pistons can also be produced by a translatory, relative movement between a power input member and a power outlet member. The lost motion between the power input member and the control piston can also be obtained in another fashion without the utilization of push rods. It is thus possible, for example, to permit the power input member, after overcoming a pre-determined spring-path, to affect the control pistons directly. Finally, it is also possible that the pre-stressing of at least one spring can be made adjustable.

What is claimed is:

1. In a pressure fluid control device for controlling working chambers of a servo-motor comprising two control valves operatively connectable to actuating means fixedly connected to a power input member through relative movements between the input member and a power output member connected to the power input member by resilient coupling means, the servomotor is connected to the power output member, means including reaction areas on the control valves for reflecting developing pressures to the power input member, power transmission necessary for actuating the control valves being effected from the actuating means to the control valves via a lost motion coupling comprising prestressed coupling means connected in parallel, the two control valves being arranged transversely and off-center relative to the power input member, the improvement characterized in that the prestressed coupling means comprises resilient elements which are interposed and operable directly between control pistons and an actuating member comprising a portion of the actuating means.

2. The pressure fluid control device according to claim 1, characterized in that the resilient force imposed by said resilient elements, which develops during the deflection of the control pistons, is lower than the pre-stressing of the elastic, prestressed coupling means, between the power input member and the power output member.

3. The pressure fluid control device according to claim 1, characterized in that the resilient elements are pre-stressing springs rated so as to produce a low initial biasing pressure in the form of a released spring force in series connection in the prestressed coupling means.

* * * * *